United States Patent
Ortelt et al.

(10) Patent No.: US 10,392,469 B2
(45) Date of Patent: Aug. 27, 2019

(54) EPOXY RESIN COMPOSITIONS FOR PRODUCTION OF STORAGE-STABLE COMPOSITES

(71) Applicants: Martina Ortelt, Flein (DE); Dirk Fuchsmann, Haltern am See (DE); Sebastian de Nardo, Gelsenkirchen (DE); Eike Langkabel, Wegberg (DE); Britta Kohlstruk, Gladbeck (DE); Annette Sandkuehler, Marl (DE); Ralph Aldridge, Duelmen (DE); Katharina Karns, Marl (DE)

(72) Inventors: Martina Ortelt, Flein (DE); Dirk Fuchsmann, Haltern am See (DE); Sebastian de Nardo, Gelsenkirchen (DE); Eike Langkabel, Wegberg (DE); Britta Kohlstruk, Gladbeck (DE); Annette Sandkuehler, Marl (DE); Ralph Aldridge, Duelmen (DE); Katharina Karns, Marl (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/376,022

(22) Filed: Dec. 12, 2016

(65) Prior Publication Data

US 2017/0166687 A1  Jun. 15, 2017

(30) Foreign Application Priority Data

Dec. 11, 2015 (EP) .................................. 15199598
Dec. 1, 2016 (EP) .................................. 16201591

(51) Int. Cl.
| | |
|---|---|
| *C08G 59/50* | (2006.01) |
| *C08G 59/24* | (2006.01) |
| *C08L 63/02* | (2006.01) |
| *C08J 5/24* | (2006.01) |
| *B32B 27/26* | (2006.01) |
| *B32B 27/38* | (2006.01) |
| *C08L 63/00* | (2006.01) |
| *C08G 59/32* | (2006.01) |
| *C08J 5/04* | (2006.01) |
| *C08G 59/56* | (2006.01) |

(52) U.S. Cl.
CPC ............ *C08G 59/506* (2013.01); *B32B 27/26* (2013.01); *B32B 27/38* (2013.01); *C08G 59/245* (2013.01); *C08G 59/3227* (2013.01); *C08G 59/50* (2013.01); *C08G 59/5073* (2013.01); *C08G 59/56* (2013.01); *C08J 5/04* (2013.01); *C08J 5/042* (2013.01); *C08J 5/24* (2013.01); *C08L 63/00* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 3,901,833 A * | 8/1975 | Flynn ..................... | C03C 25/36 524/904 |
| 4,746,718 A * | 5/1988 | Gardner ............ | C08G 59/5033 525/471 |
| 5,213,897 A | 5/1993 | Baron et al. | |
| 5,318,851 A | 6/1994 | Baron et al. | |
| 5,506,081 A | 4/1996 | Terrell et al. | |
| 2013/0101863 A1 | 4/2013 | Mabuchi et al. | |
| 2017/0166688 A1 * | 6/2017 | Ortelt .................. | C08G 59/502 |

FOREIGN PATENT DOCUMENTS

| | | | |
|---|---|---|---|
| DE | 2 319 814 A1 | 10/1973 | |
| DE | 26 40 408 A1 | 3/1978 | |
| DE | 26 40 409 A1 | 3/1978 | |
| EP | 2 562 196 A1 | 2/2013 | |
| EP | 2 803 687 A1 | 11/2014 | |
| GB | 1568183 A * | 5/1980 | ........... C08G 59/184 |
| GB | 1568725 A * | 6/1980 | ........... C08G 59/506 |
| WO | WO 93/24863 A1 | 12/1993 | |
| WO | WO 2015/158768 A1 | 10/2015 | |

OTHER PUBLICATIONS

"Tech Tip 23 Tg—Glass Transition Temperature for Epoxies", provided by Epoxy Technology Inc, www.epotek.com. (Year: 2012).*
Extended European Search Report dated Feb. 26, 2016 in Patent Application No. 15199598.2 (with English translation of categories of cited documents).

* cited by examiner

Primary Examiner — Michael J Feely
(74) Attorney, Agent, or Firm — Grüneberg and Myers PLLC

(57) ABSTRACT

Epoxy resin compositions containing at least one resin component and at least one hardener component are suitable as a thermoset matrix for production of semi-finished fiber matrix products and cured fiber matrix laminates known as composites.

11 Claims, No Drawings

EPOXY RESIN COMPOSITIONS FOR PRODUCTION OF STORAGE-STABLE COMPOSITES

BACKGROUND OF THE INVENTION

Field of the Invention

The invention provides epoxy resin compositions consisting of at least one resin component and at least one hardener component, the composition being suitable as a thermoset matrix for production of semi-finished fibre matrix products and cured fibre matrix laminates known as composites.

Discussion of the Background

Epoxy resin compositions consisting of at least one epoxy resin and at least one hardener, for example amines, anhydrides or dicyandiamide, have long been known and are used in fields of application such as coatings, composites or flooring, for example.

In the context of this invention, the term "composites" is particularly used synonymously with the terms "composite components", "composite material", "fibre composite material", "composite mouldings", "fibre-reinforced plastics" or "fibre-reinforced components", "prepregs", "towpregs", "semi-finished fibre matrix product", "fibre matrix laminate", "SMC" (sheet moulding compounds), "SMC composites" (semi-finished SMC fibre matrix products), "BMC" (bulk moulding compounds), "BMC composites" (semi-finished BMC fibre matrix products).

In this context, composites are understood to mean composite materials composed of fibres and a polymer or resin matrix. Composites of this kind feature high specific stiffness and strength combined with low weight, and are therefore, in the context of rising demands for efficient utilization of scarce resources, gaining ever increasing attention from various industries, for example the automobile industry. In automobile construction, as well as high mechanical demands, high demands are also made on the surface quality of the components ("Class A").

Processes for producing composites can be divided into single-stage methods, for example RTM (resin transfer moulding) and VARTM (vacuum-assisted resin transfer moulding), and multistage methods, for example prepreg technology and SMC (sheet moulding compounds).

In two-stage processes for producing storage-stable composites, in the first step, a fibre is impregnated with a matrix. Subsequently, the composite, the semi-finished fibre matrix product, is transferred to a B stage. "B stage" is understood by the person skilled in the art to mean a state in which the reactive components have only partly reacted with one another until a conversion or viscosity plateau has been attained. In this state, the matrix is storage-stable and has not yet reacted to completion, and is fusible and free-flowing. However, the viscosity is much higher than in the starting state.

In a second step, the composite, the semi-finished fibre matrix product, is then cured to completion in a press to give the finished composite, the fibre matrix laminate, under thermal and pressure treatment.

Storage-stable, hot-curing, tacky and non-tacky prepreg and SMC systems based on epoxy resins are known. In this category, dicyandiamide ("DiCy")-hardening epoxy resin systems have the greatest market share. Tacky prepregs are used, for example, in aerospace, in wind power (rotor blades) and in the automobile industry. Non-tacky prepregs, by contrast, are used in applications in the electrics and electronics industry, where they are processed to give circuit board based materials or insulation or construction elements of all types. Epoxy SMC systems are likewise used in the automobile industry. Epoxy systems serve here as a substitute for conventionally used UP resins and VE resins which firstly contain styrene, which is of toxicological concern, and secondly have poorer mechanical properties than epoxy systems.

Because of its low cost, its high availability, its high latency and the balanced thermal/mechanical profile of properties of the fibre composite materials produced therefrom, dicyandiamide is used with preference and in large volumes as hardener component in epoxy resin formulations for prepregs and semi-finished SMC fibre matrix products or laminates.

Epoxy systems based on dicyandiamide for prepreg applications are described, for example, in U.S. Pat. No. 5,508,328. As described above, a low viscosity is needed for impregnation of the fibres in the first process step. Since dicyandiamide is solid, it first has to be dissolved and is then reacted partially with epoxy resins. A particular disadvantage of the use of dicyandiamide in epoxy systems for prepreg applications is its low solubility. One of the few solvents in which dissolution is possible is DMF (dimethylformamide). However, DMF is of great toxicological concern. In the field of tacky prepregs, special micronized Dicy types are available nowadays, which are dispersed into the resin formulations as a second phase. However, the digestion of the solid material is not always complete, and so Dicy conglomerates remain in the resin matrix, which leads to inhomogeneous distribution of hardener and hence to rejects for technical and also visual reasons. Moreover, the incorporation of the micronized particles by dispersion leads to a rise in viscosity. Furthermore, in the course of the subsequent curing of the remaining reactive groups of DiCy and epoxy resins, a large amount of heat of reaction in the form of heat is released, which can lead to damage to laminates and components, and so there are limitations in the construction of thick-wall components. Epoxy systems based on dicyandiamide for SMC applications are described, for example, in U.S. Pat. No. 5,508,328, WO98022527, WO2014209601, DE 2131929. Another disadvantage here is that the incorporation of DiCy (itself a solid) by dispersion leads to a higher initial viscosity.

WO2013059062 discloses compositions composed of epoxy systems and a reinforcing fibre. A disadvantage of the compositions and the process associated therewith is the high mould temperatures, which are between 170 and 225° C. in this case.

WO2014184012 discloses compositions composed of epoxy resin, an amine, e.g. propylamine or IPD, an imidazole and at least one latent hardener (dicyandiamide). A disadvantage of the compositions described therein, as well as the use of dicyandiamide, is the low storage stability of the SMC sheets (at the B stage). To determine the storage stability, the minimum viscosity was ascertained, which rose within a few days from a few hundreds of mPa*s to several thousands of mPa*s. This storage stability is considered to be inadequate since, as described above, a conversion plateau and hence also a viscosity plateau is needed at the B stage.

Documents DE 2640408, DE 2640409, DE 2540410, DE 2950067 and DE 3328134 describe 2,2,6,6-tetramethyl-4-piperidylamine (triacetonediamine or TAD for short) as a latent amine for hardening of epoxy resins. Possible applications mentioned therein are surface coatings with emphasis on powder coatings, but also moulding compositions, which can optionally be reinforced by fibres or other substances. Examples include combinations of pure TAD and epoxy resins.

SUMMARY OF THE INVENTION

Problem

The problem addressed by the present invention was therefore that of finding an epoxy resin composition that has a low initial mixing viscosity at 23-40° C., in order to assure good fibre impregnation without having to utilize solvents.

It was to be possible to convert the epoxy resin composition to a B stage at temperatures exceeding 25° C. if at all possible, in that it reaches a conversion and viscosity plateau and is storage-stable at room temperature (23° C.) for several weeks. Moreover, the epoxy resin composition is to be fully curable very quickly. Because of the technical drawbacks in the case of use of dicyandiamide, the use of this hardener was to be dispensed with. In the course of hardening, the exothermicity released was to be at a minimum.

Solution

It has been found that, surprisingly, the epoxy resin composition according to the invention has a particularly low viscosity at 23-40° C., and can be converted to a B stage at temperatures between 30 and 200° C., where a conversion and viscosity plateau is attained.

The epoxy resin composition is storage-stable for several months at this B stage.

The epoxy resin composition can be fully cured at temperatures between 120° C. and 180° C. for between 1 and 60 min.

DETAILED DESCRIPTION OF THE INVENTION

The invention provides an epoxy resin composition comprising:
A) at least one epoxy compound and
B) a hardener composition consisting of:
B1) 65%-99% of at least one polyamine based on triacetonediamine and
B2) 1%-35% of at least one compound having at least one functional group reactive toward epoxy groups in component A),
where the stoichiometric ratio of the epoxy groups of A) and the number of active hydrogen atoms of the functional groups of B) varies from 1:2 to 2:1, preferably from 1.25:1 to 1:1,
C) 0.1%-10% by weight of at least one curing accelerator, where the amounts of A)-C) add up to 100% by weight,
D) optionally additives.

Suitable as component A) are epoxy compounds. Suitable epoxy compounds are described, for example, in EP 675 185.

Contemplated are a multitude of the compounds known for this purpose that contain more than one epoxy group, preferably two epoxy groups, per molecule. These epoxy compounds may be either saturated or unsaturated and aliphatic, cycloaliphatic, aromatic or heterocyclic and may also have hydroxyl groups. They may additionally contain such substituents that do not cause any troublesome side reactions under the mixing or reaction conditions, for example alkyl or aryl substituents, ether moieties and the like. They are preferably glycidyl ethers which derive from polyhydric phenols, especially bisphenols and novolacs, and which have molar masses based on the number of epoxy groups ME ("epoxy equivalent weights", "EV value") between 100 and 1500, but especially between 150 and 250, g/eq.

Polyhydric phenols that may be mentioned by way of example are: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. It is particularly preferable to employ liquid diglycidyl ethers based on bisphenol A and bisphenol F with an epoxy equivalent weight of 150 to 200 g/eq.

It is also possible to use polyglycidyl ethers of polyalcohols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Contemplated components A) further include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention may also be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions by mass of up to 30% by weight, preferably 10% to 20% by weight, based on the mass of the polyglycidyl ethers.

A detailed enumeration of the suitable epoxy compounds can be found in the handbook "Epoxidverbindungen und Epoxidharze" [Epoxy Compounds and Epoxy Resins] by A. M. Paquin, Springer Verlag, Berlin 1958, Chapter IV, and in Lee Neville "Handbook of Epoxy Resins", 1967, Chapter 2.

Preferentially suitable as epoxy compounds are glycidyl ethers and glycidyl esters, aliphatic epoxides, diglycidyl ethers based on bisphenol A and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of Versatic acid (trade name: CARDURA E10, Shell), 3,4-epoxycyclohexylmethyl 3',4'-epoxycyclohexanecarboxylate (ECC), ethylhexyl glycidyl ether, butyl glycidyl ether, pentaerythrityl tetraglycidyl ether (trade name: POLYPOX R 16, UPPC AG), and other Polypox products having free epoxy groups.

It is also possible to use mixtures of the epoxy compounds mentioned.

The epoxy component used more preferably comprises polyepoxides based on bisphenol A diglycidyl ether, bisphenol F diglycidyl ether or cycloaliphatic types. Preference is given to using, in the curable composition according to the invention, epoxy resins selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl 3,4-epoxycyclohexanecarboxylate, particular preference being given to bisphenol A-based epoxy resins and to bisphenol F-based epoxy resins.

According to the invention, it is also possible to use mixtures of epoxy compounds as component A).

The amount of component A) is guided by the composition of component B) and is calculated such that the stoichiometric ratio of the epoxy groups of A) and the number of active hydrogen atoms of the functional groups of B) varies from 2:1 to 1:2, and preferably 1.25:1 to 1:1. This means that one epoxy group from A) reacts per hydrogen atom in the amino group from B).

Polyamines based on triacetonediamine B1) are generally known from the literature. Preferably employed as component B1) are the following amines based on triacetonediamine: 2,2,6,6-tetramethyl-4-aminopiperidine (TAD), hexamethylenebis(4-amino-2,2,6,6-tetramethylpiperidine), N-butyl-4-amino-2,2,6,6-tetramethylpiperidine, N,N-dimethylaminopropyl-4-amino-2,2,6,6-tetramethylpiperidine, N-propyl-4-amino-2,2,6,6-tetramethylpiperidine, N-isopropyl-4-amino-2,2,6,6-tetramethylpiperidine, N-hydroxyethyl-4-amino-2,2,6,6-tetramethylpiperidine, N-methoxyethyl-4-amino-2,2,6,6-tetramethylpiperidine, N-methoxyethyl-4-amino-2,2,6,6-tetramethylpiperidine, N',N'-dimethylaminoethyl-4-amino-2,2,6,6-tetramethylpiperidine, N-morpholinoethyl-4-amino-2,2,6,6-tetramethylpiperidine, N-piperazinoethyl-4-amino-2,2,6,6-tetramethylpiperidine, 4-morpholino-2,2,6,6-tetramethylpiperidine.

It is also possible to use mixtures of the aforementioned amines based on triacetonediamine B1).

Preference is given to using 2,2,6,6-tetramethyl-4-aminopiperidine (TAD) and hexamethylenebis(4-amino-2,2,6,6-tetramethylpiperidine).

The amount of component B1) used is generally 65%-99% by weight, preferably 70%-99% by weight, particularly preferably 80%-90% by weight, based on the total amount of B1) and B2).

Suitable compounds B2) are in principle those substances that have at least one functional group reactive toward epoxy groups of component A), preferably 2 to 4 reactive groups. Preferably, the compounds B2) contain at least one of the following reactive groups: OH—, NH2-, NH—, SH—, NCO— groups. Preference is given here to diamines and polyamines, amino alcohols, polymercaptans or isocyanates. It is also possible to use mixtures.

Diamines and polyamines can also be used in mixtures with latent amines, amino alcohols, polymercaptans or isocyanates.

Particular preference is given to using diamines and polyamines as component B2).

Di- or polyamines B2) are known in the literature. These may be monomeric, oligomeric and/or polymeric compounds. Monomeric and oligomeric compounds are preferably selected from the group of diamines, triamines, tetramines. The amine group of the di- or polyamines B2) may be attached to a primary, secondary or tertiary carbon atom, preferably to a primary or secondary carbon atom. It is also possible to use mixtures of di- and/or polyamines as component B2).

Components B2) used may be the following amines, alone or in mixtures:
  aliphatic amines, such as the polyalkylenepolyamines, preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, entaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N"-1,2-ethanediylbis(1,3-propanediamine), dipropylenetriamine, adipic dihydrazide, hydrazine;
  oxyalkylenepolyamines selected from polyoxypropylenediamine and polyoxypropylenetriamine (e.g. Jeffamine® D-230, Jeffamine® D-400, Jeffamine® T-403, Jeffamine® T-5000), 1,13-diamino-4,7,10-trioxatridecane, 4,7-dioxadecane-1,10-diamine;
  cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[5.2.1.02,6]decane), 4-methylcyclohexane-1,3-diamine;

araliphatic amines such as xylylenediamines;
aromatic amines selected from phenylenediamines, phenylene-1,3-diamine, phenylene-1,4-diamine, 4,4'-diaminodiphenylmethane, 2,4'-diaminodiphenylmethane, 2,2'-diaminodiphenylmethane, alone or in mixtures of the isomers;
adduct hardeners which are the reaction products of epoxy compounds, especially glycidyl ethers of bisphenol A and F, with excess amine;
polyamidoamine hardeners which are obtained by condensation of mono- and polycarboxylic acids with polyamines, especially by condensation of dimer fatty acids with polyalkylenepolyamines;
Mannich base hardeners which are obtained by reaction of mono- or polyhydric phenols with aldehydes, especially formaldehyde, and polyamines;
Mannich bases, for example based on phenol and/or resorcinol, formaldehyde and m-xylylenediamine, and also N-aminoethylpiperazine and blends of N-aminoethylpiperazine with nonylphenol and/or benzyl alcohol, phenalkamines which are obtained in a Mannich reaction from cardanols, aldehydes and amines.

It is also possible to use mixtures of the aforementioned di- or polyamines as component B2).

Preference is given to using diamines as component B2) selected from isophoronediamine (3,5,5-trimethyl-3-aminomethylcyclohexylamine, IPD), 4,4'-diaminodicyclohexylmethane, 2,4'-diaminodicyclohexylmethane, 2,2'-diaminodicyclohexylmethane (also referred to as PACM), alone or in mixtures of the isomers, a mixture of the isomers of 2,2,4-trimethylhexamethylenediamine and 2,4,4-trimethylhexamethylenediamine (TMD), adduct hardeners based on the reaction products of epoxy compounds and the aforementioned amines B2) or combination of the aforementioned amines B2). It is also possible to use mixtures of these compounds.

It is very particularly preferable when
a) isophoronediamine (3,5,5-trimethyl-3-aminomethylcyclohexylamine, IPD),
b) and/or a combination of isophoronediamine and a mixture of the isomers of 2,2,4-trimethylhexamethylenediamine and 2,4,4trimethylhexamethylenediamine (TMD), and/or 4,4'-diaminodicyclohexylmethane, 2,4'-diaminodicyclohexylmethane, 2,2'-diaminodicyclohexylmethane (also known as PACM), alone or in mixtures of the isomers,
c) and/or adduct hardeners based on the reaction products of epoxy compounds and the aforementioned amines B2) or combination of the aforementioned amines B2).
are used as component B2).

According to the invention, it is also possible to use amino alcohols as component B2). Examples of amino alcohols that may be mentioned include monoethanolamine, 3-amino-1-propanol, isopropanolamine, aminoethoxyethanol, N-(2-aminoethyl)ethanolamine, N-ethylethanolamine, N-butylethanolamine, diethanolamine, 3-(hydroxyethylamino)-1-propanol, isophorone amino alcohol and diisopropanolamine. Amino alcohols can be used alone or as mixtures of two or more amino alcohols together with di- or polyamines as component B2).

According to the invention, it is also possible to use polybasic acids and anhydrides as component B2). Examples of anhydrides include phthalic anhydride, hexahydrophthalic anhydride, methyl-1,2,3,6-tetrahydrophthalic anhydride, hexachloroendomethylene-1,2,3,6-tetrahydrophthalic anhydride, methylendomethylenetetrahydrophthalic anhydride, maleic anhydride, succinic anhydride, alkenylsuccinic anhydrides such as nonenyl- or dodecenylsuccinic anhydride, polysebacic anhydride, polyazelaic anhydride, pyromellitic dianhydride, benzophenone-3,3',4,4'-tetracarboxylic anhydride. Suitable polybasic acids and anhydrides are also mentioned in "Epoxy Resins—Chemistry and Technology; Curing Agents and Modifiers; p. 482-487, 2nd edition 1988". Polybasic acids and anhydrides can be used alone or as mixtures together with di- and polyamines as component B2).

According to the invention, it is also possible to use polymercaptans as component B2). Examples of mercaptans, also called thiols, include ethanethiol, dithiothreitol, dithioerythritol, glyceryl dithioglycolate, glycol dimercaptoacetate, trimethylolpropane trimercaptoacetate, pentaerythritol tetramercaptoacetate, glycol di(3-mercaptopropionate), trimethylolpropane tri(3-mercaptopropionate), pentaerythritol tetra(3-mercaptopropionate), dipentaerythritol hexa(3-mercaptopropionate), ethoxylated trimethylolpropane tri(3-mercaptopropionate) (product name: Thiocure ETTMP 1300), tris[2-(3-mercaptopropionyloxy)ethyl] isocyanurate. Further mercaptans are mentioned, for example, in EP394495A1, U.S. Pat. No. 4,775,733A1 and WO2007096425A2. Mercaptans can be used alone or as mixtures together with di- and polyamines as component B2)

According to the invention, it is also possible to use polyphenols as component B2). Examples of these are mentioned in "Epoxy Resins—Chemistry and Technology; Curing Agents and Modifiers; p. 481-482, 2nd edition 1988". Polyphenols can be used alone or as mixtures together with di- and polyamines as component B2)

According to the invention, it is also possible to use diols and polyols as component B2).

Diols and polyols used are, for example, ethylene glycol, propane-1,2-diol, propane-1,3-diol, diethylene glycol, dipropylene glycol, triethylene glycol, tetraethylene glycol, butane-1,2-diol, butane-1,4-diol, butylethylpropane-1,3-diol, methylpropane-1,3-diol, pentane-1,5-diol, bis(1,4-hydroxymethyl)cyclohexane (cyclohexanedimethanol), glycerol, hexanediol, neopentyl glycol, trimethylolethane, trimethylolpropane, pentaerythritol, bisphenol A, bisphenol B, bisphenol C, bisphenol F, norbornylene glycol, 1,4-benzyldimethanol, 1,4-benzyldiethanol, 2,4-dimethyl-2-ethylhexane-1,3-diol, 1,4-butylene glycol, 2,3-butylene glycol, di-β-hydroxyethylbutanediol, pentane-1,5-diol, hexane-1,6-diol, octane-1,8-diol, decanediol, dodecanediol, cyclohexanediol, 3(4),8(9)-bis(hydroxymethyl)tricyclo[5.2.1.02,6]decane (dicidol), 2,2-bis(4-hydroxycyclohexyl)propane, 2,2-bis[4-((3-hydroxyethoxy)phenyl]propane, 2-methylpropane-1,3-diol, 2-methylpentane-1,5-diol, 2,2,4(2,4,4)-trimethylhexane-1,6-diol, hexane-1,2,6-triol, butane-1,2,4-triol, tris(β-hydroxyethyl) isocyanurate, mannitol, sorbitol, polypropylene glycols, polybutylene glycols, xylylene glycol or neopentyl glycol hydroxypivalate, hydroxy acrylates, alone or in mixtures.

Particular preference is given to butane-1,4-diol, propane-1,2-diol, cyclohexanedimethanol, hexanediol, neopentyl glycol, decanediol, dodecanediol, trimethylolpropane, ethylene glycol, triethylene glycol, pentane-1,5-diol, hexane-1, 6-diol, 3-methylpentane-1,5-diol, 2,2,4(2,4,4)-trimethylhexanediol and neopentyl glycol hydroxypivalate. They are used alone or in mixtures Butane-1,4-diol is used only in mixtures.

Suitable compounds B) are also diols and polyols containing further functional groups. These are the familiar linear or lightly branched hydroxyl-containing polyesters, polycarbonates, polycaprolactones, polyethers, polythioethers, polyesteramides, polyacrylates, polyvinyl alcohols, polyurethanes or polyacetals. They preferably have a number-average molecular weight of 134 to 20 000 g/mol, more preferably of 134-4000 g/mol. In the case of the hydroxyl-containing polymers, preference is given to using polyesters, polyethers, polyacrylates, polyurethanes, polyvinyl alcohols and/or polycarbonates having an OH number of 5-500 (in mg KOH/gram).

Preference is given to linear or lightly branched hydroxyl-containing polyesters—polyester polyols—or mixtures of such polyesters. They are prepared, for example, by reaction of diols with substoichiometric amounts of dicarboxylic acids, corresponding dicarboxylic anhydrides, corresponding dicarboxylic esters of lower alcohols, lactones or hydroxycarboxylic acids.

Diols and polyols suitable for preparation of the preferred polyester polyols are, as well as the abovementioned diols and polyols, also 2-methylpropanediol, 2,2-dimethylpropanediol, diethylene glycol, dodecane-1,12-diol, cyclohexane-1,4-dimethanol and cyclohexane-1,2- and -1,4-diol.

Preference is given to using butane-1,4-diol, propane-1,2-diol, cyclohexanedimethanol, hexanediol, neopentyl glycol, decanediol, dodecanediol, trimethylolpropane, ethylene glycol, triethylene glycol, pentane-1,5-diol, hexane-1,6-diol, 3-methylpentane-1,5-diol, 2,2,4(2,4,4)-trimethylhexanediol and neopentyl glycol hydroxypivalate for preparation of the polyester polyols.

Dicarboxylic acids or derivatives suitable for producing the polyester polyols may be aliphatic, cycloaliphatic, aromatic and/or heteroaromatic in nature and may optionally be substituted, for example by halogen atoms, and/or unsaturated.

The preferred dicarboxylic acids or derivatives include succinic acid, adipic acid, suberic acid, azelaic acid, sebacic acid, 2,2,4(2,4,4)-trimethyladipic acid, phthalic acid, phthalic anhydride, isophthalic acid, terephthalic acid, dimethyl terephthalate, tetrahydrophthalic acid, maleic acid, maleic anhydride and dimeric fatty acids.

Suitable polyester polyols further include polyester polyols obtainable in a known manner, via ring opening, from lactones, such as ε-caprolactone, and simple diols as starter molecules. It is also possible to use mono- and polyesters of lactones, e.g. □-caprolactone or hydroxycarboxylic acids, e.g. hydroxypivalic acid, L-hydroxydecanoic acid, □-hydroxycaproic acid, thioglycolic acid, as starting materials for the preparation of the polymers G). Polyesters of the abovementioned (p. 6) polycarboxylic acids or derivatives thereof and polyphenols, hydroquinone, bisphenol A, 4,4'-dihydroxybiphenyl or bis(4-hydroxyphenyl) sulphone; polyesters of carbonic acid obtainable from hydroquinone, diphenylolpropane, p-xylylene glycol, ethylene glycol, butanediol or hexane-1,6-diol and other polyols by customary condensation reactions, for example with phosgene or diethyl or diphenyl carbonate, or from cyclic carbonates such as glycol carbonate or vinylidene carbonate, by polymerization in a known manner; polyesters of silicic acid, polyesters of phosphoric acid, for example of methane-, ethane-, β-chloroethane-, benzene- or styrenephosphoric acid or derivatives thereof, for example phosphoryl chlorides or phosphoric esters and polyalcohols or polyphenols of the abovementioned type; polyesters of boric acid; polysiloxanes, for example the products obtainable by hydrolysis of dialkyl-dichlorosilanes with water and subsequent treatment with polyalcohols, and those obtainable by addition of polysiloxane dihydrides onto olefins, such as allyl alcohol or acrylic acid, are suitable as starting materials for the preparation of the compounds B).

The polyesters can be obtained in a manner known per se by condensation in an inert gas atmosphere at temperatures of 100 to 260° C., preferably 130 to 220° C., in the melt or in azeotropic mode, as described, for example, in Methoden der Organischen Chemie [Methods of Organic Chemistry] (Houben-Weyl); volume 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961.

Additionally usable with preference are linear or branched polyether polyols. Examples of these are Lupranol 1000, 1100, 2032, 3402, 3300, 3422, 3504/1, 3505/1, Polyol 4800, 4640, 4525, 4360, polytetramethylene ether glycols, for example Terathane 250, 650, 1000 and 2000, Voranol CP 300, CP 450, CP 755, Caradol ET 380-02, ET 570-02, Sovermol 750, 760, 805, 810 and 815.

Likewise usable with preference are (meth)acrylates and poly(meth)acrylates containing OH groups. They are prepared by copolymerization of (meth)acrylates, where individual components bear OH groups but others do not.

This produces a randomly distributed polymer containing OH groups, which contains no, one or many OH groups. Polymers of this kind are described in High solids hydroxy acrylics with tightly controlled molecular weight. van Leeuwen, Ben. S C Johnson Polymer, Neth. PPCJ, Polymers Paint Colour Journal (1997), 187(4392), 11-13;

Special techniques for synthesis of high solid resins and applications in surface coatings. Chakrabarti, Suhas; Ray, Somnath. Berger Paints India Ltd., Howrah, India. Paintindia (2003), 53(1), 33-34, 36, 38-40;

VOC protocols and high solid acrylic coatings. Chattopadhyay, Dipak K.; Narayan, Ramanuj; Raju, K. V. S. N. Organic Coatings and Polymers Division, Indian Institute of Chemical Technology, Hyderabad, India. Paintindia (2001), 51(10), 31-42.

The diols and dicarboxylic acids/derivatives thereof used for producing the polyester polyols may be employed in any desired mixtures.

It is also possible to use mixtures of polyether polyols, polyester polyols and diols.

Suitable compounds B2) are also the reaction products of polycarboxylic acids and glycidyl compounds, as described, for example, in DE-A 24 10 513.

Diols and polyols can be used alone or as mixtures together with di- and polyamines as component B2).

According to the invention, it is also possible to use any desired aromatic, aliphatic, cycloaliphatic and/or (cyclo) aliphatic diisocyanates and/or polyisocyanates as component B2).

Examples of aromatic diisocyanates and polyisocyanates are phenylene 1,3- and 1,4-diisocyanate, naphthylene 1,5-diisocyanate, toluidine diisocyanate, tolylene 2,6-diisocyanate, tolylene 2,4-diisocyanate (2,4-TDI), diphenylmethane 2,4'-diisocyanate (2,4'-MDI), diphenylmethane 4,4'-diisocyanate, mixtures of monomeric diphenylmethane diisocyanates (MDI) and oligomeric diphenylmethane diisocyanates (polymer MDI), xylylene diisocyanate and tetramethylxylylene diisocyanate. Examples of aliphatic and cycloaliphatic isocyanates are pentane diisocyanate, hexane diisocyanate, cyclohexane diisocyanate, 4-isocyanatomethyl-1,8-octane diisocyanate (TIN), isophorone diisocyanate (IPDI), hexamethylene diisocyanate (HDI), diisocyanatodicyclohexylmethane (H12MDI), 2,2,4-trimethylhexamethylene diisocyanate, 2,4,4-trimethylhexamethylene diisocyanate (TMDI) and mixtures thereof, norbornane diisocyanate (NBDI). The isocyanates can be blocked with suitable blocking agents. Particular preference is given to using IPDI, HDI, TMDI and H12MDI, alone or in mixtures.

Further suitable isocyanates are also mentioned in WO2014184257A1.

It is also possible to use the isocyanurates, if they are preparable. It will be appreciated that it is also possible to use mixtures of the diisocyanates and polyisocyanates.

In addition, preference is given to using oligo- or polyisocyanates which can be prepared from the stated diisocyanates or polyisocyanates or mixtures thereof by linking by means of urethane, allophanate, urea, biuret, uretdione, amide, isocyanurate, carbodiimide, uretonimine, oxadiazinetrione or iminooxadiazinedione structures. Isocyanurates are particularly suitable, especially of IPDI and/or HDI.

According to the invention, it is also possible to use latent hardeners as component B2). A latent hardener used may in principle be any compound known for this purpose, i.e. any compound which is inert toward epoxy resins below the defined limiting temperature of 80° C. but reacts rapidly with crosslinking of the resin as soon as this limiting temperature has been exceeded. The limiting temperature for the latent hardeners used is preferably at least 85° C., especially at least 100° C. Compounds of this kind are well known and also commercially available. In principle, it is possible to use latent hardeners selected from dicyandiamide, cyanoguanidines, aromatic amines, guanidines, modified polyamines, N-acylimidazoles, imidazoles, carbonyl hydrazides, triazine derivatives, melamine and derivatives thereof, N-cyanoacylamide compounds, acylthiopropylphenols.

Examples of suitable latent hardeners are dicyandiamide, cyanoguanidines, for example the compounds described in U.S. Pat. No. 4,859,761 or EP-A-306 451, aromatic amines, for example 4,4'- or 3,3'-diaminodiphenyl sulphone, or guanidines, for example 1-o-tolylbiguanide, or modified polyamines, for example Ancamine T M 2014 S (Anchor Chemical UK Limited, Manchester).

Suitable latent hardeners are also N-acylimidazoles, for example 1-(2,4,6-trimethylbenzoyl)-2-phenylimidazole or 1-benzoyl-2-isopropylimidazole. Such compounds are described, for example, in U.S. Pat. Nos. 4,436,892, 4,587, 311 or JP Patent 743,212.

Further suitable hardeners are metal salt complexes of imidazoles, as described, for example, in U.S. Pat. Nos. 3,678,007 or 3,677,978, carbonyl hydrazides, for example adipic dihydrazide, isophthalic dihydrazide or anthranilic hydrazide, triazine derivatives, for example 2-phenyl-4,6-diamino-s-triazine (benzoguanamine) or 2-lauryl-4,6-diamino-s-triazine (lauroguanamine), and melamine and derivatives thereof. The latter compounds are described, for example, in U.S. Pat. No. 3,030,247.

Other suitable latent hardeners are cyanoacetyl compounds, as described, for example, in U.S. Pat. No. 4,283, 520, for example neopentyl glycol bis(cyanoacetate), N-isobutylcyanoacetamide, hexamethylene 1,6-bis(cyanoacetate) or cyclohexane-1,4-dimethanol bis(cyanoacetate).

Suitable latent hardeners are also N-cyanoacylamide compounds, for example N,N-dicyanoadipamide. Such compounds are described, for example, in U.S. Pat. Nos. 4,529,821, 4,550,203 and 4,618,712.

Further suitable latent hardeners are the acylthiopropylphenols described in U.S. Pat. No. 4,694,096 and the urea derivatives disclosed in U.S. Pat. No. 3,386,955, for example toluene-2,4-bis(N,N-dimethylcarbamide).

Preferred latent hardeners are 4,4'-diaminodiphenyl sulphone and dicyandiamide.

It is also possible to use mixtures of the aforementioned latent amines as component B2).

The hardener component B2) is used in amounts of 1%-35% by weight, preferably of 1%-30% by weight, more preferably of 10%-20% by weight, based on the total amount of B1) and B2).

In addition, curing accelerators are present as component C) and are added as catalysts for the epoxy-amine reaction. Suitable accelerators are described in: H. Lee and K. Neville, Handbook of Epoxy Resins, McGraw-Hill, New York, 1967. Examples of suitable accelerators are organic acids such as salicylic acid, dihydroxybenzoic acid, trihydroxybenzoic acid, methylsalicylic acid, 2-hydroxy-3-isopropylbenzoic acid or hydroxynaphthoic acids, lactic acid and glycolic acid, tertiary amines such as benzyldimethylamine (BDMA), 1,4-diazabicyclo[2.2.2]octane (DABCO), triethylamine, N,N'-dimethylpiperazine or aminoethylpiperazine (AEP), hydroxylamines such as dimethylaminomethylphenol, bis(dimethylaminomethyl)phenol, 2,4,6-tris(dimethylaminomethyl)phenol (Ancamine K54), urons such as 3-(4-chlorophenyl)-1,1-dimethylurea (monuron), 3-(3,4-dichlorophenyl)-1,1-dimethylurea (diuron), 3-phenyl-1,1-dimethylurea (fenuron), 3-(3-chloro-4-methylphenyl)-1,1-dimethylurea (chlortoluron), tetraalkylguanidines such as N,N,N',N'-tetramethylguanidine (TMG), imidazole and imidazole derivatives such as 1H-imidazole, 1-methylimidazole, 2-methylimidazole, 1-benzyl-2-methylimidazole, 2-ethyl-4-methylimidazole, 2-phenylimidazole, 2-phenyl-4-methylimidazole, 1-vinylimidazole, 1-(2-hydroxyethyl)imidazole, 1,2-dimethylimidazole, 1-cyanoethylimidazole and the suitable salts thereof, phenol and phenol derivatives such as t-butylphenol, nonylphenol, bisphenol A or bisphenol F, and organic or inorganic salts and complexes such as methyltriphenylphosphonium bromide, calcium nitrate (Accelerator 3130), or carboxylates, sulphonates, phosphonates, sulphates, tetrafluoroborates or nitrates and triflates of Mg, Ca, Zn and Sn. Particular preference is given to imidazole and imidazole derivatives.

According to the invention, 0.1%-10% by weight, preferably 0.1%-5% by weight, more preferably 0.5%-2.0% by weight, based on the total amount of the components of at least one curing accelerator is used.

The composition of the invention may optionally comprise additives D). Additives are understood to mean substances which are generally added in order to alter the properties of the epoxy composition in the desired direction, for example to match viscosity, wetting characteristics, stability, reaction rate, blister formation, storability or adhesion, and also use properties, to the end use. Suitable additives are described, for example, in WO 99/55772, p. 15-25, and in "Plastics Additives, R Gachter and H. Miiller, Hanser Publishers 1983". These can be added to component A) or B).

For example, it is possible to add light stabilizers, for example sterically hindered amines, or other auxiliaries as described, for example, in EP 669 353 in a total amount of 0.05% to 5% by weight, based on the sum total of A), B) and C).

Fillers and pigments, for example calcium carbonate or titanium dioxide, or organic dyes, may be added in an amount of up to 250% by weight, based on the sum total of A), B) and C).

For the production of the reactive compositions of the invention, it is additionally possible to add additives such as levelling agents, for example polysilicones, or adhesion promoters, for example those based on acrylate. In addition, still further components may optionally be present.

Auxiliaries and additives used in addition may be chain transfer agents, plasticizers, stabilizers and/or inhibitors.

In addition, it is possible to add dyes, nanoscale fillers, tougheners (toughness improvers), mould release agents, flame retardants, pigments, desiccants, wetting, dispersing and levelling auxiliaries, solvents, adhesion promoters, UV stabilizers, defoamers and rheology additives.

In addition, it is possible to add thermoplastic resins to the epoxy resin compositions, in order to improve mechanical properties, especially with regard to toughness, contraction and shrinkage. The literature already discloses a multitude of thermoplastic resins such as polyester, polymethylmethacrylate, polyvinyl butyral, polyvinyl acetal, polyvinyl formal, polyvinylpyrrolidones, polycarbonates and polyamides.

Further examples are cited in U.S. Pat. Nos. 7,754,322, 7,968,179, 8,021,752 and 8,470,923.

The invention also provides for the use of an epoxy resin composition comprising:
A) at least one epoxy compound
and
B) a hardener composition consisting of:
B1) 65%-99% of at least one polyamine based on triacetonediamine and
B2) 1%-35% of at least one compound having at least one functional group reactive toward epoxy groups in component A),
where the stoichiometric ratio of the epoxy groups of A) and the number of active hydrogen atoms of the functional groups of B) varies from 1:2 to 2:1, preferably from 1.25:1 to 1:1,
C) 0.1%-10% of a curing accelerator,
where the amounts of A)-C) add up to 100% by weight,
D) optionally additives,
for production of storage-stable composites.

The invention also provides storage-stable composites, formed essentially from
1) at least one fibrous carrier
and
2) an epoxy resin composition comprising:
A) at least one epoxy compound
and
B) a hardener composition consisting of:
B1) 65%-99% of at least one polyamine based on triacetonediamine
and
B2) 1%-35% of at least one compound having at least one functional group reactive toward epoxy groups in component A),
where the stoichiometric ratio of the epoxy groups of A) and the number of active hydrogen atoms of the functional groups of B) varies from 1:2 to 2:1, preferably from 1.25:1 to 1:1,
C) 0.1%-10% of at least one curing accelerator,
where the amounts of A)-C) add up to 100% by weight,
D) optionally additives.

The invention also provides storage-stable prepregs and storage-stable SMC (sheet moulding compound) composites, formed essentially from
1) at least one fibrous carrier
and
2) an epoxy resin composition comprising:
A) at least one epoxy compound
and
B) a hardener composition consisting of:
B1) 65%-99% of at least one polyamine based on triacetonediamine
and
B2) 1%-35% of at least one compound having at least one functional group reactive toward epoxy groups in component A),
where the stoichiometric ratio of the epoxy groups of A) and the number of active hydrogen atoms of the functional groups of B) varies from 1:2 to 2:1, preferably from 1.25:1 to 1:1,
C) 0.1%-10% by weight of at least one curing accelerator,
where the amounts of A)-C) add up to 100% by weight,
D) optionally additives.

The invention also provides composite components produced in accordance with the invention, formed from at least one fibrous carrier and at least one crosslinked composition:

Composite components formed from at least one fibrous carrier and at least one crosslinked composition composed of:
A) at least one epoxy compound
and
B) a hardener composition consisting of:
B1) 65%-99% of at least one polyamine based on triacetonediamine
and
B2) 1%-35% of at least one compound having at least one functional group reactive toward epoxy groups in component A),
where the stoichiometric ratio of the epoxy groups of A) and the number of active hydrogen atoms of the functional groups of B) varies from 1:2 to 2:1, preferably from 1.25:1 to 1:1,
C) 0.1%-10% by weight of at least one curing accelerator,
where the amounts of A)-C) add up to 100% by weight,
D) optionally additives.

Fibrous Carrier

The fibrous carrier material for the composites which is used with preference in accordance with the invention is characterized in that the fibrous carriers consist for the most part of glass, carbon, polymers such as polyamide (aramid) or polyesters, natural fibres, or mineral fibre materials such as basalt fibres or ceramic fibres, individually or of mixtures, or of multiple plies of various fibre types.

The fibrous carriers take the form of sheetlike textile structures made from nonwoven fabric, of knitted fabric including loop-formed and loop-drawn knits, of non-knitted structures such as woven fabrics, laid scrims or braids, or of long-fibre or short-fibre materials, individually or of multiple plies of various types.

In detail, the implementation is as follows: The fibrous carrier in the present invention consists of fibrous material (also often called reinforcing fibres). Any material that the fibres consist of is generally suitable, but preference is given to using fibrous material made of glass, carbon, plastics such as polyamide (aramid) or polyester, natural fibres, or mineral fibre materials such as basalt fibres or ceramic fibres (oxidic fibres based on aluminium oxides and/or silicon oxides). It is also possible to use mixtures of fibre types, for example woven fabric combinations of aramid and glass fibres, or carbon and glass fibres. Hybrid composite components comprising prepregs composed of different fibrous carriers are likewise suitable.

Mainly because of their relatively low cost, glass fibres are the most commonly used fibre types. In principle, all types of glass-based reinforcing fibres are suitable here (E glass, S glass, R glass, M glass, C glass, ECR glass, D glass, AR glass, or hollow glass fibres).

Carbon fibres are generally used in high-performance composites, where another important factor is the lower density compared to glass fibres with simultaneously high strength. Carbon fibres are industrially produced fibres composed of carbonaceous starting materials which are converted by pyrolysis to carbon in a graphite-like arrangement.

A distinction is made between isotropic and anisotropic types: isotropic fibres have only low strengths and lower industrial significance; anisotropic fibres exhibit high strengths and rigidities with simultaneously low elongation at break. Natural fibres refer here to all textile fibres and fibrous materials which are obtained from plant and animal material (for example wood fibres, cellulose fibres, cotton fibres, hemp fibres, jute fibres, flax fibres, sisal fibres and bamboo fibres). Similarly to carbon fibres, aramid fibres exhibit a negative coefficient of thermal expansion, i.e. become shorter on heating. Their specific strength and their modulus of elasticity are markedly lower than those of carbon fibres. In combination with the positive coefficient of expansion of the matrix resin, it is possible to produce components of high dimensional stability. Compared to carbon fibre-reinforced plastics, the compressive strength of aramid fibre composites is much lower. Known brand names for aramid fibres are Nomex® and Kevlar® from DuPont, or Teijinconex®, Twaron® and Technora® from Teijin. Particularly suitable and preferred carriers are those made of glass fibres, carbon fibres, aramid fibres or ceramic fibres. The fibrous material is a sheetlike textile structure. Suitable materials are sheetlike textile structures made from nonwoven fabric, and likewise knitted fabric including loop-formed and loop-drawn knits, but also non-knitted fabrics such as woven fabrics, laid scrims or braids. In addition, a distinction is made between long-fibre and short-fibre materials as carriers. Likewise suitable in accordance with the invention are rovings and yarns. In the context of the invention, all the materials mentioned are suitable as fibrous carriers. An overview of reinforcing fibres is contained in "Composites Technologies", Paolo Ermanni (Version 4), script for lecture at ETH Zürich, August 2007, Chapter 7.

The invention especially also provides for the use of the composites produced in accordance with the invention in boat and shipbuilding, in air and aerospace technology, for bicycles, preferably motorcycles and pedal cycles, construction, medical technology, sports, energy generation plants, for rotor blades of wind turbines, preferably in the automotive sector, in the pressure vessels sector and in the electrics and electronics industry.

In the two-stage process for producing the composites according to the invention, in the first step, a fibre is impregnated with a matrix. Subsequently, the composite, the semi-finished fibre matrix product, is transferred to a B stage. "B stage" is understood by the person skilled in the art to mean a state in which the reactive components have only partly reacted with one another until a conversion and viscosity plateau has been attained. The epoxy resin composition according to the invention has a particularly low initial viscosity of <1000 mPa*s at 23° C. and can be converted to a B stage at temperatures between 30 and 200° C., preferably between 30 and 150° C., where a conversion and viscosity plateau is attained, to a conversion of 1%-90%, preferably 50%-80%, more preferably 60%-80%. The matrix composed of the epoxy resin composition and the composite in this state is storage-stable and has not yet reacted to completion, and is fusible and free-flowing. However, the viscosity is much higher than in the starting state.

The epoxy resin composition according to the invention is storage-stable for several months at this B stage.

The storage-stable composites according to the invention, especially the prepregs according to the invention and the SMC composites, after being cooled down to room temperature, have very high storage stability at room temperature. According to the reactive epoxy composition and catalysis present, this storage stability is at least a few days at room temperature, but the prepregs are generally storage-stable for several weeks or even months at room temperature or lower. The prepregs thus produced are usually not tacky and therefore have very good handling and further processibility. The reactive compositions used in accordance with the invention accordingly have very good adhesion and distribution on the fibrous carrier.

In a second step, the composite, the semi-finished fibre matrix product, is then cured to completion in a press to give the finished composite, the fibre matrix laminate, under thermal and pressure treatment. Typical curing temperatures are between 120 and 180° C.

The epoxy resin composition according to the invention can be cured to completion at temperatures between 120° C. and 180° C., preferably 120 and 160° C., more preferably 130° C. and 150° C., for between 1 and 60 minutes, preferably 1 and 20 minutes, more preferably 2 and 10 minutes.

The invention also provides a process for producing storage-stable composites by the process steps of:
I. providing an epoxy resin composition comprising
A) at least one epoxy compound
and
B) a hardener composition consisting of:
B1) 65%-99% by weight of at least one diamine and/or polyamine based on triacetonediamine
and
B2) 1%-35% by weight of at least one further diamine and/or polyamine, where the stoichiometric ratio of the epoxy groups of A) and the number of active hydrogen atoms of the functional groups of B) varies from 1:2 to 2:1, preferably from 1.25:1 to 1:1,
C) 0.1% to 10% by weight of at least one curing accelerator,
where the amounts of A)-C) add up to 100% by weight,
D) optionally additives,
II. impregnating a fibrous carrier with the composition from I,
III. converting the epoxy resin composition from I at temperatures of 23-200° C., preferably 23-160° C., more preferably 23-120° C., to a conversion of 1%-90%, preferably 50%-80%, more preferably 60%-80%;
IV. unwinding or laying out the storage-stable composite.

Description of the Production of Storage-Stable SMC Composites (Semi-Finished SMC Fibre Matrix Products)

The invention also provides a process for producing storage-stable SMC composites by the process steps of:
I. providing an epoxy resin composition comprising
A) at least one epoxy compound
and
B) a hardener composition consisting of:
B1) 65%-99% by weight of at least one diamine and/or polyamine based on triacetonediamine
and
B2) 1%-35% by weight of at least one further diamine and/or polyamine, where the stoichiometric ratio of the epoxy groups of A) and the number of active hydrogen atoms of the functional groups of B) varies from 1:2 to 2:1, preferably from 1.25:1 to 1:1,
C) 0.1% to 10% by weight of at least one curing accelerator,
where the amounts of A)-C) add up to 100% by weight,
D) optionally additives, II. impregnating a fibrous carrier with the composition from I, III. converting the epoxy resin composition from I at temperatures of 23-200° C. to a conversion of 1%-90%, IV. laying out the reactive SMC composites.

For preparation of the epoxy composition I. used in accordance with the invention, the hardener component B) is first prepared. For this purpose, the liquid constituents B1) and B2) and optionally C) may be mixed. Subsequently, any solid components should be dissolved in the mixture. This can also be promoted by heating.

Subsequently, the resin component is prepared by, if appropriate, mixing two or more liquid epoxy resins A) with one another. Subsequently, any solid components should be dissolved in the mixture. This can also be promoted by heating.

If necessary, auxiliaries of component A) or B) are optionally also mixed in and dispersed.

The two components are stored separately until use. For use, these two components are mixed with one another in a manner known per se. To this end, it is possible to use standard mixing units which are common knowledge to those skilled in the art. In order to have a low impregnation viscosity of 50 to 3000 mPa*s, preferably of 200 to 1500 mPa*s, more preferably of 200 to 1000 mPa*s, the individual components, prior to mixing, can be preheated to 30-80° C., preferably to 30-40° C. The mixture is cast in two bar applicators and distributed over two carrier films. Subsequently, one film is provided with chopped fibres. Then the second carrier film with the epoxy system is placed onto the first film. The layer structure composed of epoxide and fibres is mixed well with the aid of rollers. After the mixing, there may optionally be thermally initiated thickening of the composition, by running the semi-finished fibre matrix product, for example, through a heat chamber or under an infrared lamp. The heat at temperatures of 50-200° C., preferably 80-140° C., leads to a preliminary reaction, as a result of which the viscosity rises. On leaving the heat chamber or the infrared lamp, for example, the semi-finished fibre matrix product cools down. Finally, the semi-finished fibre matrix product (SMC sheet) is wound up. This semi-finished product is storage-stable for several months at −20-30° C.

In another execution, the semi-finished fibre matrix product is not thermally thickened after mixing with the rollers, but cut into sections and laid out. These sections are stored at temperatures of 25-100° C., preferably at 25-50° C., more preferably at 25-35° C., for 10 min to 7 days, preferably 20 min to 3 days, more preferably 60 min to 1 day, ripen at that temperature and are then storage-stable at −20-30° C. for several months. After the preliminary reaction described in a heat chamber or under an infrared lamp or after a ripening time, the viscosity has risen such that, in the subsequent pressing operation at, for example, 150° C., the matrix carries the fibres with it because it has a sufficiently high viscosity. Applied to the matrix, therefore, at least a melt viscosity of 3000 mPa*s at 150° C. is required, which is attained through the preliminary reaction described in a heat chamber or under an infrared lamp or after a ripening period.

The production of the cured SMC composites, i.e. of fibre composite components, can be conducted as follows: The storage-stable, thickened SMC sheet is cut into small strips and placed into the press mould. Then the press is closed and the sheets are pressed. Suitable curing temperatures are between 120° C. and 180° C., preferably 120 and 160° C., more preferably 140° C. and 150° C. Curing times are between 1-60 min, preferably between 1-20 min, more preferably between 2-10 min. The pressure is 40-120 bar, preferably 60-80 bar.

The composition I has a glass transition temperature (Tg) of 50-220° C., preferably of 80 to 160° C.

Description of the Production of Storage-Stable Prepregs

The invention also provides a process for producing storage-stable prepregs by the process steps of:

I. providing an epoxy resin composition comprising
   A) at least one epoxy compound
   and
   B) a hardener composition consisting of:
   B1) 65%-99% by weight of at least one diamine and/or polyamine based on triacetonediamine
   and
   B2) 1%-35% by weight of at least one further diamine and/or polyamine, where the stoichiometric ratio of the epoxy groups of A) and the number of active hydrogen atoms of the functional groups of B) varies from 1:2 to 2:1, preferably from 1.25:1 to 1:1,
   C) 0.1% to 10% by weight of at least one curing accelerator,
   where the amounts of A)-C) add up to 100% by weight,
   D) optionally additives, II. impregnating a fibrous carrier with the composition from I, III. converting the epoxy resin composition from I at temperatures of 23-200° C. to a conversion of 1%-90%, laying out the reactive prepreg.

For preparation of the epoxy composition used in accordance with the invention, the hardener component B) is first prepared. For this purpose, the liquid constituents B1) and B2) and optionally C) may be mixed. Subsequently, any solid components should be dissolved in the mixture. This can also be promoted by heating.

Subsequently, the resin component is prepared by, if appropriate, mixing two or more liquid epoxy resins A) with one another. Subsequently, any solid components should be dissolved in the mixture. This can also be promoted by heating.

Auxiliaries of component A) or B) are also mixed in and dispersed.

The two components are stored separately until use. For use, these two components are mixed with one another in a manner known per se. To this end, it is possible to use standard mixing units which are common knowledge to those skilled in the art. In order to have a low impregnation viscosity of 50 to 3000 mPa*s, preferably of 200 to 1500 mPa*s, more preferably of 200 to 1000 mPa*s, the individual components, prior to mixing, can be preheated to 30-80° C., preferably to 30-40° C. In addition, solvents may optionally be added to the mixture.

The prepregs are produced in a fibre impregnation plant intended for the purpose. For production, the mixture is poured into a resin tank within the impregnation plant. The fibre material is guided through the resin tank and impregnated with the mixture, and then passes between two squeeze rollers. Excess resin material is squeezed out at the squeeze rollers. Thus, the proportion by volume of fibres in the semi-finished products is regulated. Subsequently, the resin material is guided, for example, through a heated oven, such that, firstly, any solvent present is removed and, secondly, a preliminary reaction proceeds. The oven heat leads to a preliminary reaction at temperatures of 50-200° C., preferably 80-160° C., and, if appropriate, to the escape of the solvent from the semi-finished fibre matrix product, as a result of which the viscosity rises. On leaving the oven, for example, the semi-finished fibre matrix product cools down. Finally, the semi-finished fibre matrix product is wound up. This semi-finished product is storage-stable for several months at −20-30° C.

In another execution, the composition does not contain any solvent and is covered with a film after the squeeze roller and cut into sections and laid out. These sections are stored at temperatures of 25-100° C., preferably at 25-50° C., more preferably at 25-35° C., for 10 min to 7 days, preferably 20 min to 3 days, more preferably 60 min to 1 day, and are then storage-stable at −20-30° C. for several months.

The production of cured composites, i.e. of fibre composite components, can be conducted as follows: The storage-stable, thickened prepreg is cut to size so as to fit the mould and placed into the press mould. Then the press is closed and the prepregs are pressed. Suitable curing temperatures are between 120° C. and 200° C., preferably 120 and 180° C., more preferably 140° C. and 160° C. Curing times are between 1-60 min, preferably between 1-20 min, more preferably between 2-10 min. The pressure is 1-120 bar, preferably 10-80 bar.

The composition I has a glass transition temperature (Tg) of 50-220° C., especially of 80 to 160° C.

EXAMPLES

The feedstocks utilized in the examples which follow are elucidated in Table 1.

Having generally described this invention, a further understanding can be obtained by reference to certain specific examples which are provided herein for purposes of illustration only, and are not intended to be limiting unless otherwise specified.

Example 1

A glass flask was initially charged with 600 g of TAD (primary amine groups: 3.8 mol), and 184.2 g of Cardura E10P (0.76 mol of epoxy groups) were added dropwise at 30° C. within 30 min. The reaction mixture was left to stand overnight. The amine number was 541 mg KOH/g.

Example 2

To prepare resin component A), 3.3 kg of Araldite XB 9721 (29.5 mol of epoxy groups) were preheated to 60° C. and then mixed with 1.3 kg of Epikote 828 (6.9 mol of epoxy groups).

To prepare hardener component B), 34.6 g of 2,4-EMI were dissolved in 1.92 kg of TAD (12.3 mol of primary amine groups) at 40° C. Subsequently, 0.59 kg of the TAD adduct (2.3 mol of primary amine groups) from Example 1 and 70 g of PAT 657 BW were added.

The hardener was mixed once again at room temperature.

Example 3

The resin component used was 5.5 kg of Epikote 828 (29.3 mol of epoxy groups).

To prepare the hardener component, 1.34 kg of TAD (8.6 mol of primary amine groups) were mixed with 0.15 kg of IPD (1.8 mol of primary amine groups) at room temperature. Then 34.3 g of 2,4-EMI were added and dissolved at 40° C. Subsequently, 70 g of PAT 657 BW were added and the mixture was mixed once again at room temperature.

Example 4

The resin component used was 5.5 kg of Epikote 828.

To prepare the hardener component, 1.34 kg of TAD were mixed with 0.15 kg of IPD at room temperature. Then 68.6 g of 2,4-EMI were added and dissolved at 40° C. Subse-

TABLE 1

| | | Feedstocks | |
|---|---|---|---|
| Trade name | Supplier | Chemical name | Abbreviation |
| Triacetonediamine | Evonik Industries | 2,2,6,6-Tetramethyl-4-aminopiperidine | TAD |
| VESTAMIN ® IPD | Evonik Industries | 3-Aminomethyl-3,5,5-trimethylcyclohexylamine | IPD |
| Cardura E10P | Möller Chemie | Oxiranylmethyl neodecanoate | — |
| Epikote ® 828 | Hexion | Epoxy resin formed from bisphenol A and epichlorohydrin | — |
| Araldite ® XB 9721 | Huntsman | 4,4'-Methylenebis[N,N-bis(2,3-epoxypropyl)aniline] | — |
| 2-Ethyl-4-methylimidazole | Sigma Aldrich | 2-Ethyl-4-methylimidazole | 2,4-EMI |
| PAT 657 BW | E. and P. Würtz | Mixture: lubricant and release agent | — |
| Millicarb ® OG | OMYA | Calcium carbonate (filler) | Millicarb |
| Dimethylformamide | Carl Roth GmbH & Co KG | Dimethylformamide | DMF |
| Isopropyl acetate | Thermo Fischer (Kandel) GmbH | Isopropyl acetate | — | quently, 70 g of PAT 657 BW were added and the mixture was mixed once again at room temperature.

Example 5

To prepare the resin component, 5.5 kg of Epikote 828 were mixed with 1.75 kg of isopropyl acetate.

To prepare the hardener component, 1.35 kg of TAD were mixed with 0.15 kg of IPD at room temperature. Then 14 g of 2,4-EMI were added and dissolved at 40° C. while stirring.

Example 6

The resin component used was 5.5 kg of Epikote 828.

To prepare the hardener component, 1.35 kg of TAD were mixed with 0.15 kg of IPD at room temperature. Then 14 g of 2,4-EMI were added and dissolved at 40° C. while stirring.

Example 14

The resin component used was 5.5 kg of Epikote 828 (29.3 mol of epoxy groups).

To prepare the hardener component, 1.16 kg of TAD (7.4 mol of primary amine groups) were mixed with 0.29 kg of IPD (3.4 mol of primary amine groups) at room temperature. Then 69.7 g of 2,4-EMI were added and dissolved at 40° C. Subsequently, 70 g of PAT 657 BW were added and the mixture was mixed once again at room temperature.

Production of Storage-Stable SMC Composites and SMC Laminates

Example 7

The resin component from Example 2 was heated to 40° C. and mixed with the hardener component from Example 2 with the aid of a dissolver. The mixture was cast in two bar applicators and distributed over two carrier films. Subsequently, one film was provided with chopped carbon fibres. Then the second carrier film with the epoxy system was placed onto the first film. The layer structure composed of epoxide and fibres was mixed well with the aid of rollers. Subsequently, the SMC sheets were cut into sections and laid out. The proportion by mass of carbon fibres was 60%.

The SMC sections were stored at about 25° C. for 3 days. Then the sheets were cut into small 10 cm×20 cm strips. 4 of these strips were packed one on top of another and placed into a plate press mould. The press was heated at 150° C. The press was closed and the sheets were pressed to form a laminate. After 10 min, it was possible to remove and characterize the sheets. The pressure was 80 bar.

Example 8

The resin component from Example 2 was heated to 40° C. and first blended with Millicarb with the aid of a dissolver. The amount of Millicarb was chosen such that matrix and filler are in a ratio of 1:1. Then the mixture of resin and filler was mixed with the hardener component from Example 2 with the dissolver. The mixture was cast in two bar applicators and distributed over two carrier films. Subsequently, one film was provided with chopped glass fibres. Then the second carrier film with the epoxy system was placed onto the first film. The layer structure composed of epoxide and fibres was mixed well with the aid of rollers. Subsequently, the SMC sheets were cut into sections and laid out. The proportion by mass of glass fibres was 30%.

The storage and the pressing of the SMC sections were effected as described in Example 7.

Example 9

The production of SMC sheets and press laminates was effected analogously to Example 7 with the composition from Example 3 as matrix. Carbon fibres were used.

Example 10

The production of SMC sheets and press laminates was effected analogously to Example 8 with the composition from Example 3 as matrix. Glass fibres were used.

Example 11

The resin component from Example 4 was heated to 30° C. and mixed with the hardener component from Example 4 with the aid of a dissolver. The mixture was cast in two bar applicators and distributed over two carrier films. Subsequently, one film is provided with chopped carbon fibres. Then the second carrier film with the epoxy system film was placed onto the first film. The layer structure composed of epoxide and fibres was mixed well with the aid of rollers. Subsequently, the SMC sheets were cut into sections and laid out. The proportion by mass of carbon fibres was 60%.

The SMC sections were stored at about 25° C. for 3 days. Then the sheets were cut into small 10 cm×20 cm strips. 4 of these strips were packed one on top of another and placed into a plate press mould. The press was heated at 150° C. The press was closed and the sheets were pressed to form a laminate. After 5 min, it was possible to remove and characterize the sheets. The pressure was 80 bar.

Production of Storage-Stable Prepregs and Prepreg Laminates

Example 12

The resin and hardener components from Example 5 were mixed with the aid of a Speedmixer at room temperature. Then the mixture was poured into the resin tank of an impregnation plant (Basecoater from Coatema). A biaxial carbon scrim (Toray T700, +/−45 biax, basis weight: 308 g/m$^2$) was guided through the resin tank and impregnated with the mixture, and then passed between two squeeze rollers. Excess resin material was squeezed out at the squeeze rollers. Subsequently, the semi-finished product was guided through an oven for 20 min. The fan in the oven was set to 100° C. The solvent was removed therein and the preliminary reaction was conducted. On leaving the oven, the semi-finished fibre matrix product cooled down quickly and was dry. Finally, the semi-finished fibre matrix product was wound up. The basis weight of the semi-finished product was 610 g/m$^2$.

For production of prepreg laminates, the prepregs were cut to size so as to fit the mould and inserted into the press mould. The press was heated at 140° C. The press was shut and the prepreg was cured. It was possible to reopen the press after 60 min and remove the cured laminate. The pressure was 15 bar.

Example 13

The production of prepregs and prepreg laminates was effected analogously to Example 12 with the composition from Example 6 as matrix. A carbon biax was used.

Comparative Examples (Noninventive)

Comparative Example 1

The resin component used was 5.5 kg of Epikote 828.
For production of the hardener component, 1.52 kg of TAD were mixed with 70 g of PAT 657 BW at room temperature.

Comparative Example 2

The resin component used was 5.5 kg of Epikote 828.
For production of the hardener component, 1.52 kg of TAD were heated to 40° C. and 35 g of 2,4-EMI were dissolved while stirring. Subsequently, 70 g of PAT 657 BW were mixed into the mixture at room temperature.

Comparative Example 3

The resin component used was 7 kg of Epikote 828.
The hardener consisted of 0.455 kg of dicyandiamide and 0.065 kg of 2,4-EMI.

Comparative Example 4

The resin component used was 7 kg of Epikote 828.
The hardener consisted of 0.43 kg of dicyandiamide, 0.043 kg of IPD and 0.06 kg of 2,4-EMI.

Comparative Example 5

The resin component used was 7 kg of Epikote 828.
The hardener consisted of 0.455 kg of dicyandiamide and 1.49 g of 2,4-EMI. The solid constituents were dissolved in 5 kg of dimethylformamide at 40° C.

Production of SMC Sheets and Prepregs from Comparative Examples 1-5

Comparative Example 6

The production of SMC sheets and press laminates was effected analogously to Example 8 with the composition from Comparative Example 1 as matrix.

Comparative Example 7

The production of SMC sheets and press laminates was effected analogously to Example 8 with the composition from Comparative Example 2 as matrix.

Comparative Example 8

The production of prepregs and prepreg laminates was effected analogously to Example 12 with the composition from Comparative Example 1 as matrix. A carbon biax was used.

Comparative Example 9

The resin and hardener components from Comparative Example 5 were mixed with the aid of a Speedmixer at room temperature. Then the mixture was poured into the resin tank of an impregnation plant (Basecoater from Coatema). A biaxial carbon scrim (Toray T700, +/−45 biax, basis weight: 308 g/m$^2$) was guided through the resin tank and impregnated with the mixture, and then passed between two squeeze rollers. Excess resin material was squeezed out at the squeeze rollers.

Subsequently, the semi-finished product was guided through an oven for 20 min. The fan in the oven was set to 130° C. The solvent was removed therein and the preliminary reaction was conducted. On leaving the oven, the semi-finished fibre matrix product cooled down quickly and was dry. Finally, the semi-finished fibre matrix product was wound up. The basis weight of the semi-finished product was 580 g/m$^2$.

For production of prepreg laminates, the prepregs were cut to size so as to fit the mould and inserted into the press mould. The press was heated at 140° C. The press was shut and the prepreg was cured. It was possible to reopen the press after 60 min and remove the cured laminate. The pressure was 15 bar.

Test Methods

For characterization of the epoxy systems, SMC sheets, prepregs and composites produced from SMC sheets and prepregs, the following instruments and methods were used:

Rheometer MCR 301 from Anton-Paar (handling described in DIN 53019)

First method for SMC matrix: plate-plate, isothermal, amplitude gamma=2%, frequency f=1 Hz, measurement duration: 5 s. Determination of gel time (when storage modulus=loss modulus) and of initial viscosity (lowest viscosity measured) at temperatures ≥100° C.

Second method for prepregs: plate-plate, temperature ramp of 80-180° C., 5 K/min, amplitude gamma=2%, frequency f=1 Hz, measurement duration 5 s. Determination of gel time (when storage modulus=loss modulus).

Rheotec RC30 Brookfield rotary viscometer (handling described in DIN 53019).

Concentric cylinder, isothermal, measurement duration 10 s.

Determination of initial viscosity (lowest viscosity measured) at temperatures <100° C.

MettlerDSC (handling described in DIN 11357)

Temperature −30 to +250° C., heating rate 10 K/min

Determination of glass transition temperature (Tg), half-step method, midpoint DIN 51007, and of enthalpy of reaction (exothermic heat flow)

Determination of Conversion:

$$\left(1 - \left(\frac{\text{exothermic heat flow after curing}}{\text{exothermic heat flow before curing}}\right)\right) * 100\%$$

Tensile tests according to DIN EN ISO 527
Bending tests according to DIN EN ISO 14125
Short-beam bending tests for determination of apparent interlaminar shear strength (ILSS) according to DIN EN ISO 14130

Results

Results for Examples 2-4 and 7-11 (SMC Sheets) and Comparative Examples 1-4

Formulations from Examples 2-4 and formulations from Comparative Examples 1 to 4 were mixed and characterized by means of DSC and a rheometer to ascertain initial properties and storage stability. The initial property presented in Tab. 2 was the initial mixed viscosity at 30° C.

TABLE 2

Mixed viscosities of the resin/hardener mixtures from
Ex. 2-4, 14 and Comparative Examples 1-4 at 30° C.

|  | Ex. 2 | Ex. 3 | Ex. 4 | Ex. 14 | Comp. Ex. 1 | Comp. Ex. 2 | Comp. Ex. 3 | Comp. Ex. 4 |
|---|---|---|---|---|---|---|---|---|
| Viscosity at 30° C. [mPa*s] | 380 | 840 | 850 | 930 | 700 | 710 | 7030 | 8320 |

Examples 2-4 and 14 show a viscosity below 1000 mPa*s at 30° C. Comparative Examples 1 and 2 likewise show a viscosity below 1000 mPa*s. Comparative examples 3 and 4 show an initial viscosity above 1000 mPa*s and are therefore of less good suitability in relation to fibre impregnation.

Storage stability was examined by storing the mixtures at room temperature for several weeks and examining them at regular intervals by means of a rheometer at 150° C. with regard to viscosity, and by means of DSC with regard to Tg. The results are shown in Tab. 3 and Tab. 4.

| Viscosity at 150° C. [mPa*s] | Ex. 2 | Ex. 3 | Ex. 4 | Ex. 14 | Comp. Ex. 1 | Comp. Ex. 2 | Comp. Ex. 3 | Comp. Ex. 4 |
|---|---|---|---|---|---|---|---|---|
| After 0 d (after preparation) | <10 | 20 | 137 | 16 | 20 | 13 | 23 | 31 |
| After 1 d | 176 | 1166 | 1036 | 580 | 230 | 341 | 34 | 26 |
| After 7 d | 4865 | 4847 | 5930 | 3340 | 1650 | 2373 | 71 | 3470 |
| After 14 d | 5701 | 5664 | 7431 | 6480 | 2387 | 3640 | 26 117 000 | 38 370 000 |
| After 21 d | 5861 | 5845 | 7643 | 7370 | 2626 | — | — | — |
| After 28 d | 6020 | 6105 | 7952 | 7640 | 3151 | — | — | — |

As can be seen in Table 3, Examples 2-4 and 14 directly after preparation still have a very low melt viscosity at 150° C., but this rises significantly after only one day (d). After 7 days, the melt viscosity for Examples 2-4 and 14 is above 3000 mPa*s. Comparative Examples 1, 2 and 3, by contrast, still have a melt viscosity below 3000 mPa*s after 7 days. The melt viscosity is thus too low, and so the matrix would flow too significantly in the subsequent pressing operation. After 14 days, the melt viscosity of Comparative Examples 3 and 4 is above 10 000 000 mPa*s and is thus too high. Moreover, no attainment of a viscosity plateau for Examples 3 and 4 is apparent, and so the formulations cannot be considered to be storage-stable. Examples 2-4 and 14, by contrast, reach a viscosity plateau after no later than 14 days.

TABLE 4

DSC analyses of mixtures from Ex. 2-4, 14 and Comparative Examples 1-4 after storage at 23° C.

| Tg [° C.] (DSC, 1st heating) | Ex. 2 | Ex. 3 | Ex. 4 | Ex. 14 | Comp. Ex. 1 | Comp. Ex. 2 | Comp. Ex. 3 | Comp. Ex. 4 |
|---|---|---|---|---|---|---|---|---|
| After 0 d (after preparation) | −18 | −13 | −14 | −18 | −20 | −18 | −19 | −17 |
| After 1 d | 15 | 31 | 30 | 25 | 28 | 31 | −15 | −14 |
| After 7 d | 47 | 49 | 50 | 49 | 46 | 48 | −7 | 0 |
| After 14 d | 51 | 54 | 52 | 54 | 50 | 54 | 18 | 27 |
| After 21 d | 53 | 56 | 55 | 54 | 52 | — | — | — |
| After 28 d | 55 | 59 | 60 | 58 | 54 | — | — | — |

The DSC analyses in Table 4 show, for Examples 2-4 and 14, that the Tg rises at first and then settles after about 7 days (d) at 50 to 60° C. The same behaviour is observed for Comparative Examples 1 and 2. For Comparative Examples 3 and 4, by contrast, no settling at a particular Tg level can be observed. Thus, no storage stability for Comparative Examples 3 and 4 is observed in the DSC either.

SMC sheets according to Examples 7-11 showed very good fibre wetting because of the low initial viscosity. They were pressed after a storage time of 3 days. Mechanical properties were ascertained on the laminates produced, and these are shown in Tab. 5.

TABLE 5

Mechanical properties of SMC components according to Examples 7-11

|  | Unit | Ex. 7 | Ex. 8 | Ex. 9 | Ex. 10 | Ex. 11 |
|---|---|---|---|---|---|---|
| Test sheet size | mm | | 250 × 120 | | | |
| Flexural strength | MPa | 530 | 393 | 664 | 463 | 636 |
| Flexural modulus | GPa | 33 | 14 | 30 | 13 | 32 |
| Tensile strength | MPa | 188 | 148 | 265 | 212 | 237 |

TABLE 5-continued

Mechanical properties of SMC components according to Examples 7-11

|  | Unit | Ex. 7 | Ex. 8 | Ex. 9 | Ex. 10 | Ex. 11 |
|---|---|---|---|---|---|---|
| Tensile modulus | GPa | 33 | 17 | 42 | 22 | 43 |
| Elongation at break | % | 0.6 | 1.6 | 0.7 | 1.6 | 0.6 |

SMC sheets according to Comparative Examples 6 and 7 were pressed at 150° C. after a storage time of 3 days. Because of the low melt viscosity, it was not possible to produce laminates or determine mechanical properties.

Results for Examples 5-6 and 12-13 (Prepregs) and Comparative Examples 1 and 4

For Inventive Examples 5 and 6 and Comparative Examples 1 and 5, the initial viscosities were first measured. They are shown in Table 6.

TABLE 6

Initial viscosities of Ex. 5 and 6 and Comp. Ex. 1 and 5

|  | Ex. 5 | Ex. 6 | Comp. Ex. 1 | Comp. Ex. 5 |
|---|---|---|---|---|
| Solvent content | 20% | 0% | 0% | 40% |
| Viscosity at 23° C. [mPa * s] | 32 | 1343 | 1263 | 180 |
| Viscosity at 40° C. [mPa * s] | — | 281 | — | — |

Example 5 with a solvent content of 20% has a very low viscosity at 23° C. and is thus suitable for the impregnation of fibres. Example 6 without solvent has a correspondingly higher viscosity. An increase in the impregnation temperature from room temperature to 40° C. results in a fall in the viscosity to 281 mPa*s, which is likewise sufficient for good impregnation of fibres. The same applies to Comparative Example 1 based on TAD. Comparative Example 5 based on DiCy has a low viscosity only when the solvent content is very high (40%). The solvent chosen was DMF. As an alternative for DiCy, it is also possible to use solvents that are less hazardous to health, such as acetone. In that case, however, more solvent is used (solubility of DiCy: 27.2 g in 100 g of DMF, 0.8 g in 100 g of acetone; source: technical data sheet for dicyandiamide, Alz Chem).

To determine the residual enthalpy of the prepreg matrix, matrix material was detached from the fibres in the prepregs and then analysed.

TABLE 7

Residual enthalpy after prepreg production

|  | Ex. 12 | Comp. Ex. 9 |
|---|---|---|
| Residual exothermicity after prepreg production | 95 J/g | 184 J/g |
| Exothermicity of the matrix prior to prepreg production | 418 J/g | 454 J/g |
| Conversion | 77% | 59% |

Table 7 shows the reaction enthalpy of the matrix according to the invention compared to a matrix based on DiCy. The total enthalpy prior to the reaction is at about the same level. In the form of a prepreg, however, the composition according to the invention from Example 12 exhibits only half as much exothermicity as a DiCy prepreg in Comparative Example 9, which leads to more process safety in the production of laminates, since less heat is released.

To determine the storage stability of the prepregs, matrix material was detached from the fibres and then analysed.

TABLE 8

Storage stability of prepregs

|  | Ex. 12 | Ex. 13 | Comp. Ex. 8 | Comp. Ex. 9 |
|---|---|---|---|---|
| After 1 d |  |  |  |  |
| Gel time | 10 min, 56 sec | 6 min, 12 sec | 13 min, 36 sec | 11 min, 38 sec |
| Temperature at gel time | 135° C. | 110° C. | 147° C. |  |
| After 7 d |  |  |  |  |
| Gel time | 10 min, 48 sec | 6 min, 6 sec | 13 min, 12 sec | 10 min, 34 sec |
| Temperature at gel time | 133° C. | 109.6 | 146° C. | 133° C. |
| After 21 d |  |  |  |  |
| Gel time | 10 min, 36 sec | 5 min, 6 sec | 13 min, 5 sec | 8 min, 23 sec |
| Temperature at gel time | 132° C. | 106° C. | 144° C. | 122° C. |

As can be seen in Table 8, the values for the gel time change only slightly over the storage period of 21 days for Examples 12 and 13 and Comparative Example 8. For Comparative Example 9, the gel times, by contrast, change much more significantly over 21 days, which suggests low storage stability.

In Table 9, the processing viscosities of the prepreg matrices were determined at 140° C. For this purpose, matrix material was detached from the fibres and then analysed.

TABLE 9

| Processing viscosity at 140° C. after 1 d | | | |
|---|---|---|---|
| | Ex. 12 | Ex. 13 | Comp. Ex. 8 |
| Initial viscosity at 140° C. | 3210 | 3640 | 1940 |

As shown in Table 9, the processing viscosity for Examples 12 and 13 at 140° C. is above 3000 mPa*s. Therefore, it was possible to press the prepregs efficiently without too much resin flowing out of the mould. Mechanical indices for Examples 12 and 13 can be found in Table 10. Comparative Example 8, by contrast, has a much lower viscosity. This led to significant resin flow on pressing.

TABLE 10

| Mechanical properties of laminates based on Examples 12 and 13 | | |
|---|---|---|
| | Ex. 12 | Ex. 13 |
| Tensile strength [MPa] | 856 | 878 |
| Tensile modulus [GPa] | 55.8 | 56.2 |
| Elongation at break [%] | 1.7 | 1.5 |
| Flexural strength [MPa] | 813 | 827 |
| Flexural modulus [GPa] | 49.4 | 49.7 |
| ILSS | 62 | 66 |

European patent application EP15199598, filed Dec. 11, 2015, and European patent application EP16201591, filed Dec. 1, 2016 are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. An epoxy resin composition, comprising:
   A) at least one epoxy compound selected from the group consisting of a diglycidyl ether based on bisphenol A and a diglycidyl ether based on bisphenol F;
   B) a hardener composition comprising:
      B1) 65%-99% by weight of at least one polyamine based on triacetonediamine, and
      B2) 1%-35% by weight of at least one compound having at least one functional group reactive toward epoxy groups in component A) selected from the group consisting of
      (B2a) isophoronediamine,
      (B2b) 4,4'-diaminodicyclohexylmethane, 2,4'-diaminodicyclohexylmethane, 2,2'-diaminodicyclohexylmethane, alone or in mixtures thereof, and
      (B2c) a mixture of 2,2,4-trimethylhexamethylenediamine and 2,4,4-trimethylhexamethylenediamine,
      wherein B1 and B2 total 100% by weight of B), and the stoichiometric ratio of the epoxy groups of A) and the number of active hydrogen atoms of the functional groups of B) varies from 1:2 to 2:1, and
   C) 0.1%-10% by weight of at least one curing accelerator selected from the group consisting of an imidazole and an imidazole derivative,
   wherein the amounts of A)-C) add up to 100% by weight.

2. The epoxy resin composition according to claim 1, wherein the at least one polyamine based on triacetonediamine, B1), is selected from the group consisting of 2,2,6,6-tetramethyl-4-aminopiperidine (TAD), hexamethylenebis(4-amino-2,2,6,6-tetramethylpiperidine), N-butyl-4-amino-2,2,6,6-tetramethylpiperidine, N,N-dimethylaminopropyl-4-amino-2,2,6,6-tetramethylpiperidine, N-propyl-4-amino-2,2,6,6-tetramethylpiperidine, N-isopropyl-4-amino-2,2,6,6-tetramethylpiperidine, N-hydroxyethyl-4-amino-2,2,6,6-tetramethylpiperidine, N-methoxyethyl-4-amino-2,2,6,6-tetramethylpiperidine, N-methoxyethyl-4-amino-2,2,6,6-tetramethylpiperidine, N',N'-dimethylaminoethyl-4-amino-2,2,6,6-tetramethylpiperidine, N-morpholinoethyl-4-amino-2,2,6,6-tetramethylpiperidine, N-piperazinoethyl-4-amino-2,2,6,6-tetramethylpiperidine, and 4-morpholino-2,2,6,6-tetramethylpiperidine.

3. The epoxy resin composition according to claim 1, wherein B1) is 2,2,6,6-tetramethyl-4-aminopiperidine (TAD) and B2) is isophoronediamine.

4. A composition comprising the epoxy resin composition according to claim 1 and D) an additive.

5. A storage-stable composite, obtained from the epoxy resin composition according to claim 1.

6. A storage-stable composite, obtained from
   1) at least one fibrous carrier, and
   2) the epoxy resin composition according to claim 1.

7. A process for producing a storage-stable composite according to claim 6, said process comprising:
   I. providing said epoxy resin composition,
   II. impregnating the fibrous carrier with the composition from I,
   III. converting the epoxy resin composition from I at temperatures of 23-200° C. to a conversion of 1%-90%,
   IV. unwinding or laying out the storage-stable composite.

8. A storage-stable prepreg or storage-stable sheet moulding compound composite, obtained from
   1) at least one fibrous carrier, and
   2) the epoxy resin composition according to claim 1.

9. A process for producing a storage-stable sheet moulding compound composite, said process comprising:
   I. providing the epoxy resin composition according to claim 1,
   II. impregnating a fibrous carrier with the composition from I,
   III. converting the epoxy resin composition from I at temperatures of 23-200° C. to a conversion of 1%-90%, to obtain a reactive sheet moulding compound composite, and
   IV. laying out the reactive sheet moulding compound composite.

10. A process for producing a storage-stable prepreg, said process comprising:
   I. providing the epoxy resin composition according to claim 1,
   II. impregnating a fibrous carrier with the composition from I,
   III. converting the epoxy resin composition from I at temperatures of 23-200° C. to a conversion of 1%-90%, to obtain a reactive prepreg, and
   IV. laying out the reactive prepreg.

11. A composite component, obtained from at least one fibrous carrier and at least one crosslinked epoxy resin composition, wherein said epoxy resin composition is as defined in claim 1.

* * * * *